United States Patent [19]

Schwartz

[11] Patent Number: 5,113,893
[45] Date of Patent: May 19, 1992

[54] SAFETY PRESSURE RELIEF VALVE SHUT-OFF

[76] Inventor: John E. Schwartz, 1642 Buckhorn La., Billings, Mont. 59105

[21] Appl. No.: 516,343

[22] Filed: Apr. 30, 1990

[51] Int. Cl.⁵ .............................................. F16K 17/40
[52] U.S. Cl. ........................ 137/70; 137/347; 137/587; 251/57
[58] Field of Search ................ 137/70, 347, 587; 251/57

[56] References Cited

U.S. PATENT DOCUMENTS

| | | | |
|---|---|---|---|
| 1,801,750 | 4/1931 | McEachern | 251/57 X |
| 1,960,831 | 5/1934 | Shand | 251/57 X |
| 2,748,799 | 6/1956 | Rath | 137/587 |
| 3,704,718 | 12/1972 | Rudel | 281/57 X |

Primary Examiner—Gerald A. Michalsky

[57] ABSTRACT

The invention is a normally open safety shut-off valve, totally within a vessel of pressurized product, which vessel requires a safety pressure relief valve. This normally open safety shut-off valve is placed between the safety pressure relief valve and the product in the vessel and can be closed by a person of average intelligence without special tools in the event that an uncontrollable leak develops in the said relief valve, later to spontaneously reopen if the pressure of the product in the vessel rises to a dangerous high level. This is of particular value in the containment of hazardous gases or liquids under pressure in a transportation vessel, without diminishing existing safety pressure relief valve principals.

2 Claims, 4 Drawing Sheets

SAFETY PRESSURE RELIEF VALVE SHUT-OFF

TECHNICAL FIELD

This invention relates to novel safety valve that is totally within the closed pressure vessel it protects and safeguards against an otherwise uncontrollable leak from a pressure safety relief valve.

NEED FOR THIS INVENTION

In recent years the rise in the standard of living in this country has caused a growing need for chemical compounds of all kinds, including toxic, flammable and otherwise hazardous pressurized liquid or gas in a closed vessel having a safety pressure relief valve. In order that a safety pressure relief valve be dependable, responsible people have adopted the rule that no mechanism (including a valve) be placed between the safety pressure relief valve and the contents of the vessel, which mechanism can possibly restrict the functioning of the said safety pressure relief valve if the pressure of the contents of the vessel later increased to a dangerous high level. The function of such a safety pressure relief valve is the controlled discharge of part of the contents of the vessel if such contents increase in pressure to a level that threatens rupturing of the vessel resulting in the uncontrolled escape of all of the contents. As an average person of the trade reads on it will become apparent that this new novel safety pressure relief valve shut-off does not interfere with the normal function of the safety pressure relief valve. It is the normal practice to attach the safety pressure relief valve on the outside surface of the vessel by means of a bolted flange or a pipe thread. These are normally reliable means but they do fail from time to time. The gasket sealing the flange or the screwed pipe thread may start leaking, after being struck by a force such as a collision or from decay caused by chemical corrosion. The spring holding the valve closed may stress, corrode and allow leakage through the valve seat.

In the past there has been no method of repairing these problems without emptying the tank. If the tank is in transport and no place to transfer the product in the tank and the product is toxic there is a serious problem.

It is therefore a definite advantage to have installed a Safety Pressure Relief Valve Shut-Off that will contain such hazardous liquids and gases within the tank but will not interfere with the function of the safety pressure relief valve itself if the pressure in the vessel later becomes dangerously high.

THE BACKGROUND OF THE INVENTION

This invention relates to a normally open valve that resides totally within a closed vessel containing a liquid, vapor, or gas; and can be closed from the outside of the vessel to isolate the product within from such exterior fixtures as a safety pressure relief valve in the event that the exterior fixture develops an uncontrollable leak.

The valve within the vessel, after being closed will remain closed unless the pressure within the vessel rises to a dangerously high level, threatening to burst the vessel, then it will open spontaneously, releasing the contents of the vessel to the safety pressure relief valve. This will allow the safety pressure relief valve to function normally allowing a small part of the product in the vessel to escape, reducing the internal pressure in the vessel and avoiding its rupturing and avoiding loss of all of the product.

When the pressure within the vessel is returned to a safe level, and the safety pressure relief valve has reclosed, but the original leaking problem of the safety pressure relief valve has not been corrected yet, the normally open valve of this invention that resides totally within the closed vessel may be reclosed again and cyclically function as before as the pressure within the vessel rises again.

OBJECTIVES AND ADVANTAGES

This invention solves the need for rapid, safe, dependable response to stopping uncontrolled leakage of hazardous liquids or gases through a safety pressure relief valve without interfering with the function of the safety pressure relief valve at a later time if needed, and to do it in a simple straight forward manner that is safe and easy to accomplish in the field.

Readers will find further objectives and advantages of the invention from a consideration of the ensuing description and accompanying drawings.

FIG. 1.

FIG. 2.

FIG. 3.

FIG. 4.

FIG. 5.

DESCRIPTION OF THE INVENTION

Referring to FIGS. 1, 2, 3, 4, and 5, this Safety Pressure Relief Valve Shut-Off consists of three general assemblies. One is a Normally Open Internal Tank Safety Pressure Relief Valve Shut-off Assembly, 11 which will be referred to as the NOITSS Valve Assembly. The second is a Blow-Out Safety Device, 12 which will be referred to as the BOS Device. The NOITSS Valve Assembly and the BOS Device are communicatively connected to each other by the third part, the PRESSURE Transmitting Conduit 13.

DESCRIPTION OF THE NOITSS VALVE ASSEMBLY

The NOITSS Valve Assembly comprises two subassemblies. One is the valve subassembly 14 and the other is the actuator subassembly 15. (See FIGS. 1, 2, and 3).

Figure 3:
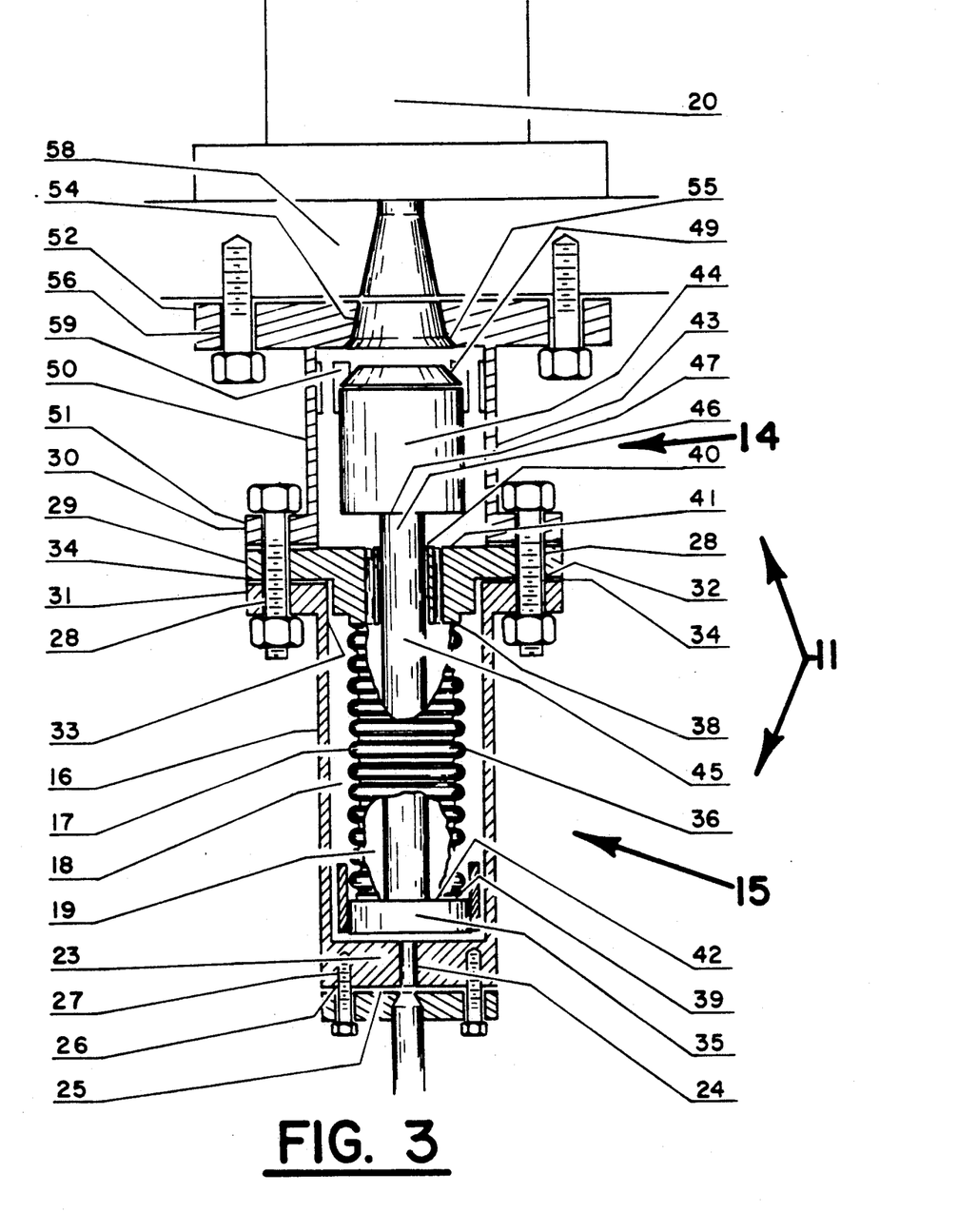
FIG. 3 is a typical cross section illustration of the parts and workings of the normally open internal tank Safety Pressure Relief Valve Shut-Off Assembly.

The actuator subassembly includes an actuator body 16. Within the actuator body resides a flexible partition 17 that divides the space within the actuator body into two compartments, the first compartment 18 and the second compartment 19.

The actuator body 16 (resembling President Lincoln's tall stovepipe hat) comprises a cylindrical tube closed at one end 23 by a thicker than normal flat planer mass, monolithic with the cylindrical tube portion of the said body. This flat planar mass extends radially inwardly from the said tube. The other end of the cylindrical tube comprises a plate like flange 31 extending radially outward from the axis of the said tube.

The closed end 23 is fitted with a number of holes 27 situated in a circle that is concentric with the axis of the cylinder, which holes intrude into the planar surface 26 in such a way that they do not extend all of the way through the thickness of the said closed end so as not to create a passage from the inside of the actuator body 16 to the outside. Each hole is fitted with threads facilitating the attachment, by bolting, of a flange that is part of a pressure transmitting conduit 13, which will be described later. The planar surface is of such accurate dimensions that it will form a leak proof seal with the said flange while using a standard gasket 25.

In addition there is a hole 24 in the center of the planar surface that serves as a passage of the actuating fluid from the pressure transmitting conduit 13 into the first compartment 18 of the actuator assembly 15.

The end of the cylindrical tube that comprises a plate-like flange 31 has a hole 33 that is concentric with the axis of the cylinder and has a bore that is as great as the inside surface of the cylinder itself. This will allow for the insertion of the flexible partition which will be described later. The flange 31 is fitted with a number of bolt holes 28 situated in a circle that is concentric with the axis of the cylindrical tube and perpendicular with the flange. The holes extending through the flange, are of smooth bore, and of sufficient diameter to allow a loose fit of the bolts, and are standard for securing this size flange to two companion flanges, the first companion flange 30, and the second companion flange 29, which are part of the valve body 43 and part of the flexible partition 17. Both the valve body and the flexible partition will be described later. The flange 31 has a facial planar surface that is of such accurate finish that it will form a leak proof seal with the surface of the said second companion flange 29, that is adjacent to it, when a standard gasket 34 is employed.

The flexible partition 17 is comprised of three parts monolithically welded into one. These parts are a rigid center part 35, a flexible intermediate part 36, and the said second companion flange 29.

The rigid center part 35 of the flexible partition 17 is a solid disk-like mass that has a diameter such that it is a loose fit when inserted into the cylindrical tubular actuator body 16. It is important that this fit be sufficiently loose so that a fluid may pass between the rigid center part and the actuator body, thus reducing trapping of fluid on either side of the proximity of these parts, which would in turn resist its motion.

The side of the said rigid center part that is exposed 42 to the second compartment 19 has a hole drilled concentric with the axis of its disk-like form. This hole does not extend all of the way through its mass thus avoiding any leakage of fluids or gases between the first compartment 18 and the second compartment 19. The hole is fitted with threads that are compatible with those on the end of a push rod 45 that connects the said rigid center part with both the push rod and the valve head assembly, which will be described later.

The flexible intermediate part 36 of the flexible partition 17 is made from any suitable material that may include steel, plastic, coated fabric and others that resist corrosion, rupture, or other destructive dynamics. For the sake of description steel will be used. The flexible intermediate part is preferably similar to a bellows, but may be a diaphragm or other that surrounds the rigid center part 35 and is monolithically welded 39 to it in such a manner that the weld is dependable for many flexing motions of the flexible partition without fatiguing and cracking the said weld.

The second companion flange 29 surrounds the flexible intermediate part and is joined by welding to it 38 in a dependable manner such that it will function through many flexing motions, similar to the manner in which the flexible intermediate part was described above, welded to the rigid center part. The second companion flange 29 is normally a flat plate like structure extending radial out from the axes of the flexible intermediate part with two parallel planar surfaces. One planar surface 32 that resides adjacent to the flange portion of the actuator body is manufactured in such planar accuracy that it will form a leak proof seal with the surface of the said flange 31 of the actuator body when a standard gasket 34 is employed. The other planar surface that resides adjacent to a first companion flange 30 of the said valve body 43 (which will be described hereinafter) is manufactured in such planar accuracy that it will form a stable, firm junction with the said valve body. No leak proof seal is necessary.

The second companion flange 29 of the flexible partition 17 resembles a thick plate with a centrally located raised portion that provides a location and purchase to which the thinner flexible intermediate part 36 can be welded to the said second companion flange. Concentrically located there is a guide hole 40 through the second companion flange such that the push rod 45 will pass through it in such a loose fitting manner that there will be no resistance to the movement to the said push rod. No seal is required between the push rod and the second companion flange because the areas on both sides of the said flange are saturated with the same product from the vessel.

The second companion flange is additionally fitted with one or more transmitting holes 41 through its body in such a manner that the product from the vessel can pass freely from the vessel to the interior of the second compartment 19 and thus the pressure of the product finds its way against the rigid center part 35 of the flexible partition 17 that is exposed 42 to the second compartment.

The second companion flange also comprises of bolt holes 28 through its peripheral area perpendicular to its planar surface. These bolt holes are situated in a circle so that the bolt holes are the same in diameter and are located with their centers in alignment with the centers of the bolt holes in the flanged end 31 of the actuator body 16.

The flexible partition 17 is mated with the actuator body by inserting the said flexible partition into the said actuator body with the rigid center part entering first, and a standard gasket 34 between the flange surfaces.

The valve subassembly 14 consists of a valve body 43, a valve head assembly 44, and a push rod 45.

The push rod 45 is an elongated rod that is of sufficient thickness to insure its linear straightness while subjected to the compressive forces sufficient to open the normally open valve.

One end of the said push rod is fitted with threads that are compatible with those in the previously described threaded hole in the rigid center part 35 of the flexible partition 17 that is exposed to the second compartment 19. The push rod is attached to the said rigid center part by inserting it through the guide hole 40, and through the second compartment 19, thus into the said threaded hole in the rigid center part and rotated until engaged with the threads and tightened. The other end 46 of the push rod 45 is similarly threaded to engage the valve head assembly 44.

The valve head assembly 44 is a truncated cylindrical mass, one end of which is fitted with a threaded hole 47 that is concentric with the axis of the said cylindrical mass to receive the threaded end of the push rod 45. The other end of the cylindrical mass of the valve head has a beveled corner 49 that has a slope conducive to producing a leak proof seal when engaged with a valve seat 55 which will be described with the valve body 43.

The valve head assembly 44 along with its beveled corner 49, the push rod 45, and the rigid center part 35 of the flexible partition 17 are all slidable movable by pressure from the actuating fluid from the pressure transmitting conduit when said fluid is directed into the first compartment 18.

The valve body 43 of the valve subassembly 14 is a spool shape of which the central portion 50 is a hollow shelled cylinder. The first end of the cylinder terminates monolithically into a flange 51 concentric with the axis of the said central cylindrical portion of the valve body and extending radially outward from it. The other end which is the second end of the cylinder terminates monolithically into a flange 52 that resembles a plate which covers the end of the central part of the cylinder by extending radially inward as well as extending radially outward and which is also concentric with the same axis of the central cylindrical portion of the same valve body. The cylindrical portion 50 also comprises openings 59 in its shell that serve as a conduit for the product in the vessel to flow through the valve when it is open.

The flange 51 at the first end of the valve body is a mirror image of the flange 31 in the open end of the actuator body 16 including the hole in the center and the number and position of the bolt holes 28. The planar surface of the flange 51 need not be manufactured so accurately as to be leak proof but must possess such accuracy as to be a stable, firm junction with the adjacent surface of the second companion flange 29.

The second end of the cylindrical portion 50 of the valve body 43 that terminates monolithically into the flange 52, comprises a hole 54 through the inward extension of the said flange, which hole is the discharge passage of the NOITSS Valve Assembly 11.

This hole having a smooth bore also has at its inner opening, a beveled concave conical surface which is the valve seat 55, previously mentioned. This valve seat is of true and accurate manufacture producing a match with the beveled corner 49 of the valve head 44 blocking the flow of the product from the vessel in a leak proof manner when the beveled corner of the valve head slidable engages the valve seat.

The portion of the flange 52 that resembles a plate and extends radially outward is of such dimension that it can conveniently possess holes 56 of sufficient size and number to accommodate bolts of sufficient size to produce a reliable structural joiner between itself and the shell of the vessel 58.

The face of the flange that is adjacent the shell of the vessel must also be manufactured with an accuracy of sufficient true planer dimensions that a standard gasket between the face of the flange and the shell of the vessel will produce a leak proof seal with moderate tightening of the bolts.

DESCRIPTION OF THE BOS DEVICE

Referring to FIGS. 1, 2, 4, and 5, the BOS Device 12 is comprised of two subassemblies. One is the weld in body subassembly 60 and the other is the blow out subassembly 61.

Figure 4:
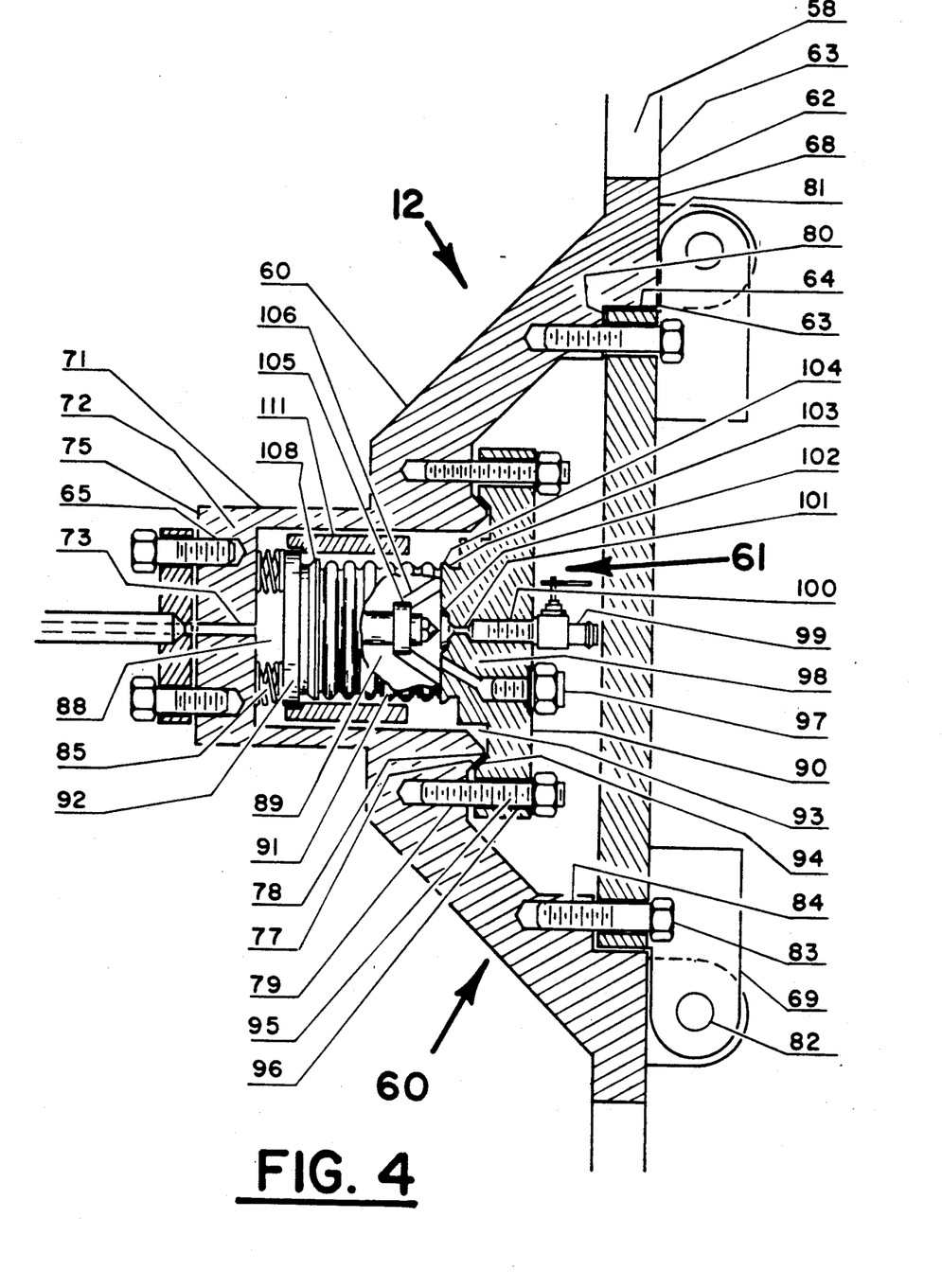
FIG. 4 is a typical cross sectional illustration of the parts and workings of the Blow-Out Safety Device.

The weld in body subassembly 60 which is a monolithic complex bell shaped housing, with a flanged outer rim 81 that is welded 62, bolted, or by other means attached directly into the shell of the vessel. For the purpose of avoiding confusion and repetition this specification will describe attachment by welding means, although it is apparent that other attachment methods are equally acceptable. Being bell shaped, the weld in body subassembly is convex on one face and concave on the other. Both faces being partial images of each other situated around a common axis, which extends perpendicular to their faces. A cross section of the said weld in body subassembly 60 being perpendicular to the said axis may be any shape that is structurally strong under the stress of the pressures and structures of the vessel it is welded into. The convex face of the weld in body subassembly is toward the interior of the vessel. The concave face of the weld in body subassembly is toward the exterior of the vessel.

The apex of the bell shaped weld in body subassembly 60 includes a cylinder 71 which is concentric with the said axis, and is closed on its end 72 that extends toward said apex, except for a small conduit hole 73 that communicates between the areas within and without the cylinder. The outside surface of the said closed end that immediately surrounds the said conduit hole is a planar surface 75. With the boundary of this planar surface, and surrounding the said conduit hole are additional threaded holes 65, extending only part way through the said closed end, avoiding additional communication similar to that provided by the said conduit hole. These additional threaded holes are situated such that they match those of a flange that is part of the pressure transmitting conduit 13, that will be described later, and will receive bolts, facilitating the attachment of the said flange to the planar surface in a leakproof manner, with the use of a gasket.

The opposite end of the said cylinder 71 which end extends away from the apex of the bell shaped housing is full open and comprises a gasket surface 77 around its periphery. The gasket surface may be a planar one such as that which was described above, or it may be more preferably described as follows:

The gasket surface 77 occupying a peripheral position around the open end of the cylinder 71 resides on the outer slope of a ridge 78 with a cross section resembling a cone. The conical surface rises from a planar surface that extends radially outward from the said open end of the cylinder 71 said planar surface extends beyond that which is needed to provide support for the conical surface and becomes a monolithic part of the said bell shaped weld in body subassembly. The said gasket surface is for the purpose of producing a leak proof seal between the weld in body subassembly 60 and the blow out subassembly 61 which will be described later.

Holes with internal threads 79 are provided in the above described planer surface, and are systematically spaced outside the periphery of the gasket surface 77 in such a manner as not to pass completely through the weld in body subassembly. This limitation is made to avoid leakage of product from within the vessel.

The previously stated flanged outer rim 81 that welds directly into the shell of the vessel extends radially outward from the axis of the bell shaped weld in body subassembly at the open end of the said subassembly and is a monolithic continuation of said subassembly.

The junction of the open end of the bell shaped portion and the flanged outer rim forms a curb 64 that faces radially inward toward the said axis of the bell shaped weld in subassembly.

A ledge 80 is provided along this inward facing curb providing a support for a cover 68, which will be described later, resulting in the outside surface and the curb being of the same plane as the outside surface of the shell of the vessel 63.

It is obvious that objects colliding with a regular planar surface are more likely to be deflected than objects colliding with an irregular surface, particularly that which has intrusions and extrusions that offer purchase. By covering as described, the intrusive bell shape of the weld in body subassembly looses its vulnerability.

As an aid to operating the BOS Device 12 the cover 68 is fixed to the flanged outer rim 81 by means of four hinges 69 functioning in pairs. The pins 82 of all four hinges are removable. When the pins of one pair of hinges are removed, the cover can swing one way. When they are replaced and the pins of the outer pair of hinges are removed, the cover can swing the other way. When all four pins are replaced, the cover is held in place. In the event that damage is done to the hinges that would impair their ability to hold the cover in place, bolts 83 are placed through the cover and screwed into threaded holes 84 in the ledge 80 of the weld in body subassembly 60 of the BOS Device. These threaded holes 84 are manufactured in such a manner that they do not extend completely through the weld in body subassembly so as to avoid communication between the inside of the vessel and the outside thus assuring against the possible leakage of product through them.

Figure 2:
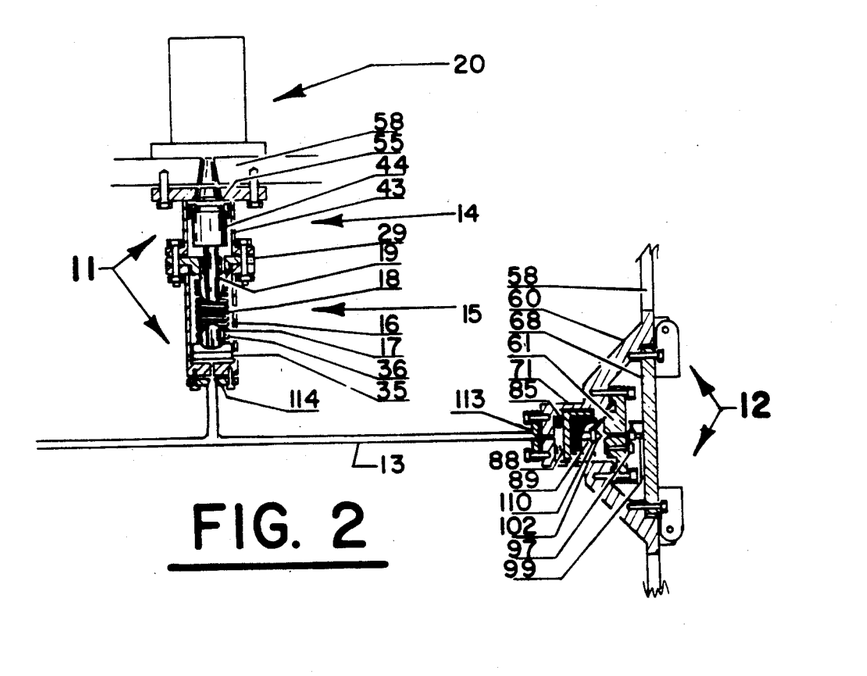
FIG. 2 is a typical sectional assembly of the normally open internal tank Safety Pressure Relief Valve Shut-Off Assembly, the Blow-Out Safety Device, and the pressure transmitting conduit, illustrating the main working parts.
Figure 5:
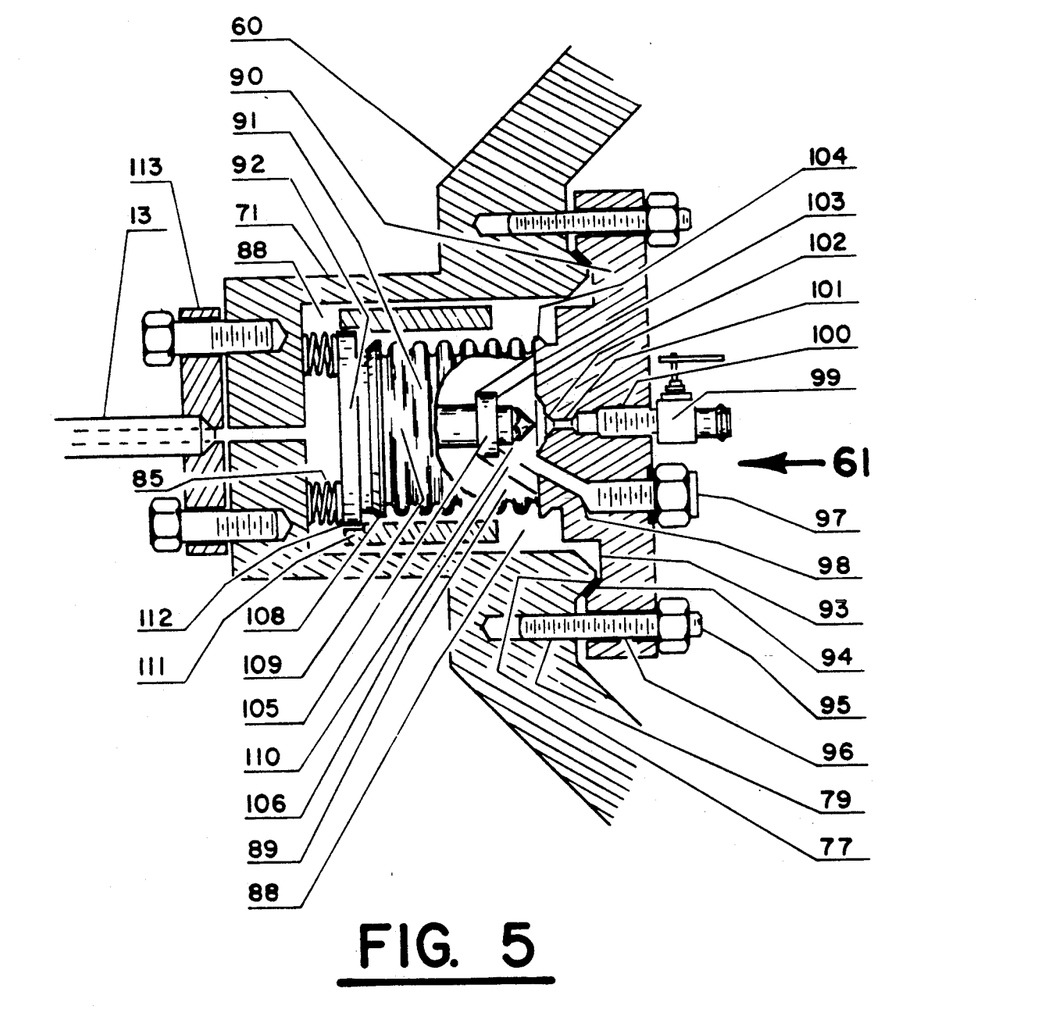
FIG. 5 is a typical cross sectional illustration of the parts and workings of particular part of the Blow-Out Safety Device that will be described as the Blow-Out Subassembly.

The BOS Device is also comprised of a blow out subassembly 61, see FIGS. 2, 4, and 5, which in turn is comprised of a flange assembly 90, flexible section 91 and a rigid section 92.

The said flange assembly 90 of the said blow out subassembly most often is a disk shaped component with a periphery that is sufficiently large that a gasket surface 77, which is a part of the weld in body subassembly 60 (FIG. 3) to allow for a groove 93 which having a sloped side 94, such that when the flange assembly is laid over the open end of the cylinder 71 the said sloped side is congruent with the said gasket surface 77 to such a degree that a leak proof junction is produced when a standard gasket is placed between the two slopes, and the bolts 95 are tightened.

The said flange assembly 90 also comprises of bolt holes 96 that are spaced around near the periphery of the flange assembly 90 of the said blow out subassembly in such a manner that they are outside of the area circumscribed by the gasket surface 77, 94. These bolts are also placed in such a manner that an equal pressure is brought to all points between the said gasket surfaces. The bolts 95, previously mentioned, extend through these holes 96, and thus also through the said flange assembly and extend into the holes with internal threads 79 that are previously described.

The said flange assembly 90 also comprises a pressure release blow out plug 97, that has a section that will yield at a predetermined pressure. This predetermined pressure will vary from one vessel to another depending on the product in the vessel. There are many such plugs marketed and therefore, it is not necessary to describe a new one other than it must be one that is easily replaced once it has blown out.

To facilitate the installation and replacement of the pressure release blow out plug 97, the flange assembly 90 comprises a hole 98 that communicates all of the way through the said flange. The hole is threaded particularly beginning at the end of the said hole that intersects the face of the flange that is opposite the before described groove 93.

The flange assembly 90 also comprises an actuator connector valve 99 that is fixed rigidly over a hole 101 that passes completely through the said flange assembly, which hole serves as a conduit through the said flange assembly. The actuator connector valve is strongly attached to the conduit hole by any standard means, one of which is tapered pipe threads 100.

The end of the hole 101 that intersects the face of the flange assembly that is on the same side of the said flange assembly as the previously described groove 93 is circumscribed by a bevel forming a concave conical seat 102 for a needle valve which valve will be described hereinafter.

The flange assembly 90 also comprises a protrusion 103 having a thin edge 104 that corresponds to the thin end of the flexible section 91 in such a manner that both thin edges can be welded together. There are many procedures to join the said flange assembly with the flexible section. The forgoing description is not meant to limit these to just the one procedure.

The flange assembly 90 also comprises a guide bushing 105 supported by at least one leg 106. One end of the leg is rigidly fixed to the face of the said protrusion (103). The other end of the leg is rigidly fixed to the guide bushing in such a manner that the said guide bushing is held firmly and reliably in a position centering over the previously described seat 102. The guide bushing is meant to assure that a needle valve, which will be described hereinafter, will slide concentrically into the said seat.

The blow out Subassembly 61 also comprises a flexible section 91. This flexible section may be a bellows or a diaphragm. The bellows being cylindrical has two ends. One end being closed by welding it, as previously described, to a thin edge 104 which is part of the flange assembly 90. The other end is closed by welding to a similar thin edge 108 which is part of the rigid section 92.

With these three parts monolithically joined, a leak proof flexible partition 109 is established between a first compartment 88 of the BOS Device and a second compartment 89 of the same BOS Device. The said first compartment of the BOS Device is that area within the cylinder 71 that is part of the weld in body subassembly 61, and the outer surface of the flexible partition 109. This first compartment 88 communicates directly with the first compartment 18 of the actuator subassembly 15, through the Pressure Transmitting Conduit 13, which conduit will be described later. When these compartments and conduit are filled with a noncompressing fluid, the actuator subassembly will become a slave of the BOS Device in such a manner that the first compartment of the actuator subassembly will increase in area as the first compartment of the BOS Device decreases in area, and the reverse.

The said leak proof flexible partition also assures that any rupture in any part of the NOITSS Valve Assembly or the Pressure Transmitting conduit will not allow product from the vessel to pass through the BOS Device and leak uncontrollably to the outside of the vessel.

From an advantageous location within the second compartment 89 of the BOS Device is a needle valve 110, consisting of a shaft, one end of which is permantently fixed to the face of the rigid section 92 of the flexible partition 109, which face is exposed to the said second compartment 89. The axes of this shaft is perpendicular and concentric with the said seat 102, previously described, and also passes through the guide bushing 105, which has also been previously described. The end of the needle valve shaft that is closest to the said seat is conical and is of the same degree of slope as the said seat, and will develop a leakproof seal when it is engaged into the said seat.

In the event that a rupture develops in the flexible partition 109 springs 85 will push the rigid section 92 and the needle valve 110 toward the valve seat 102 until it seals off the hole 101, thus functioning as a backup to assure further that the product will be contained in the vessel.

A protective sheath 111 is placed around the bellows to protect its corrugations from abrasion. This protective sheath is joined with the periphery 112 of the before described rigid section 92 of the flexible partition 109.

DESCRIPTION OF THE PRESSURE TRANSMITTING CONDUIT

Figure 1:
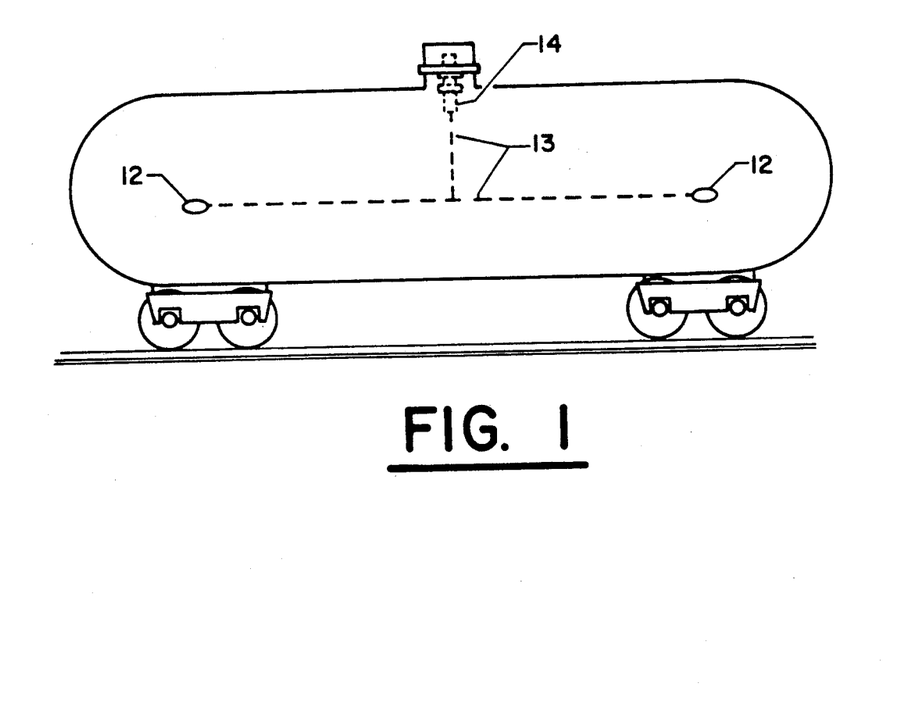
FIG. 1 is an illustration of one orientation of the normally open internal tank Safety Pressure Relief Valve Shut-Off assembly, the Blow-Out Safety Device, and the pressure transmitting conduit, as they may be applied to a railroad tank car.

The Pressure Transmitting Conduit 13, FIGS. 1 and 2, is comprised of a tubular member with thicker than normal walls so as to be structurally strong as well as conductive as it transmits hydraulic or pneumatic pressure between the BOS Device and the NOITSS Valve Assembly.

The Pressure Transmitting Conduit 13 also comprises two flanges. The first flange 113 is welded or otherwise secured to one end of the said conduit. The second flange 114 is welded or otherwise secured to the other end of the said conduit.

The first flange 113 has a surface that extends radially outward from the center of the tubular conduit with a planar surface, that is manufactured with such accuracy that when it is mated securely to the planar surface 26 at the closed end 23 of the actuator body 16 with a standard gasket between, a leak proof connection is made.

The first flange also comprises a number of holes along a circle through which bolts may be installed to insure the secure mating condition previously indicated. These holes mirror the holes 27 in the planar surface 26 of the actuator body 16, which holes 27 are internally threaded.

The second flange is similar to the description of the first flange, except that it is of dimension to fit the planar surface 75 of the weld in body subassembly 60 and the threaded holes 65 in said subassembly.

OVERALL VIEW OF INVENTION

After reading this detailed description of the parts of the NOITSS Valve Assembly BOS Device, and the Pressure Transmitting Conduit it is important to describe how they must work together. FIG. 1 illustrates that the NOITSS Valve Assembly is placed totally within the vessel. It may be remote from the Safety Pressure Relief Valve, but for the purpose of this description, it is placed directly inside of the vessel adjacent to the said Safety Pressure Relief Valve.

The NOITSS Valve Assembly normally remains in its open position until a problem occurs with the Safety Pressure Relief Valve. If this problem results in an uncontrolled leak of the product from the vessel, and the vessel is in transit, or otherwise remote from a facility where the product can be safely off loaded, the NOITSS Valve Assembly can be closed. This will isolate the product in the vessel from the faulty Safety Pressure Relief Valve.

The NOITSS Valve Assembly can be closed by connecting a hose, from a pump, to the actuator connector valve 99. There are many small hand operated portable piston pumps, having a pump handle and a fluid storage reservoir, that produces high pressure low volume hydraulic fluid. These pumps are readily available at most tool supply stores. One of these pumps could be stowed or fastened to the outside of the vessel ready to use in an emergency. In a special emergency, an ordinary grease gun can be used to supply the necessary pressurized fluid.

Through the actuator connector valve the pressurized fluid is conducted into the second compartment 89 of the BOS Device, causing it to increase in area, thus expanding the flexible partition 109 outward from the said second compartment.

The outward motion of the flexible partition 109 results in a decrease of the area in the first compartment 88 of the BOS Device. This said first compartment of the BOS Device along with the first compartment of NOITSS Valve Assembly 11, and the Pressure Transmitting Conduit 13 compose a closed and sealed chamber with the sum of all three areas always remaining the same. At a previous time, this said sum of areas have been filled with a fluid having low compressibility qualities. The result of all of the above is that when the area of the second compartment 89 of the BOS Device is increased, the area of the first compartment 88 is reduced by the same amount, because they are both enclosed within the same rigid area of the cylinder 71.

Considering the before stated conditions whereby the area of the Pressure Transmitting Conduit 13 remains consistent and the area of the first compartment 88 of the BOS Device is reduced, the area of the first compartment 18 of the NOITSS Valve Assembly must increase in area.

The first compartment 18 and the second compartment 19 of the NOITSS Valve Assembly are also confined to the rigid constant area of the actuator body 16 of the same NOITSS Valve Assembly. Thus, when the area of the said first compartment 18 expands, the area of the second compartment must reduce.

This will result in the motion of the rigid center part 35, of the flexible partition 17 of the NOITSS Valve Assembly, in the direction of the valve seat 55. This causes the push rod 45 and the valve head 44 to slide, engaging the said valve seat. This isolates the product in the vessel from the faulty safety pressure relief valve. Allowing for repairs to be made or for continuation of transporting the vessel and product to its destination. To hold the NOITSS Valve Assembly closed, it is necessary to close the actuator connector valve 99 retaining the high pressure hydraulic fluid within.

In the event that the product later builds a dangerously high level of pressure within the vessel, the product can be reintroduced to the safety pressure relief valve by the following spontaneous events.

As the new pressure build up of the product occurs, it is transmitted through holes 41 in the rigid flange 29 of the NOITSS Valve Assembly, thus into the second compartment 19 and the related side of the rigid center part 35. This pressure is transmitted to the first compartment of the NOITSS Valve Assembly by virtue of the yielding of the flexible partition 17. In turn the pressure transmitted through the fluid in the Pressure Transmitting Conduit 13 into the first compartment 88 of the BOS Device 12, and on into the second compartment 89 of the same BOS Device.

The fluid pressure in the said second compartment is transmitted to the pressure relief blow out plug 97 that has a pre-set maximum pressure tolerance. When this pre-set pressure tolerance is reached and the relief blow out plug ruptures, fluid is permitted to leak out. The area of the second compartment of the BOS Device is allowed to reduce, and the area in the first compartment of the BOS Device is allowed to increase, and the first compartment of the NOITSS Valve Assembly is allowed to decrease, and the area of the second compartment of the NOITSS Valve Assembly is allowed to increase.

All of this motion is energized by the pressure the product is exerting by entering the transmission holes 41 in the rigid flange 29 and filling the second compartment of the NOITSS Valve Assembly, moving the rigid center part 35, which pulls the valve push rod 45, which disengages the valve head 44, allowing the product to pass to the safety pressure relief valve. The said safety pressure relief valve can now discharge part of the product in the vessel and avoid rupturing the said vessel.

In the event that all of this happens while the vessel is still enroute, and the safety pressure relief valve has not yet been repaired, the pressure relief blow out plug 97 may be easily removed and replaced with a new one, and the pressurized fluid reintroduced into the actuator connector valve resulting in a reengagement of the valve head 44 with the valve seat 55 and all is safe once more to be transported.

A special advantage of all of this is that it can be accomplished by an average person, in the field, with a common adjustable wrench, with no previous special training.

An additional advantage exists in the BOS Device of this invention. The needle valve 110, seat for the needle valve 102, and springs 85 are an added safety feature that guards against any loss of product in the event of failure of any of the part of the NOITSS Valve Assembly 11, or the Pressure Transmitting Conduit 13 to remain leak proof toward the product in the vessel.

Normally the flexible section 91 of the BOS Device 12 functions as a safety seal in the event of a rupture in any part of the NOITSS Valve Assembly 11, or the Pressure Transmitting Conduit 13, assuring that the product will be contained. However, is the flexible section itself is ruptured, the spring 85 will push the flexible section 91, moving the needle valve 110 into engagement with the seat 102, closing the hole 101, further preventing any posible leak of product from the vessel.

It is to be noted that, normally the neddle valve can not move far enough to engage the seat, because of a limiting amount of fluid in the first compartment of the BOS Device.

It is further to be disclosed that this novel Safety Pressure Relief Valve Shut-Off may be fabricated from a wide variety of materials, including metals, plastics, combinations thereof, and preferably corrosion resistant materials such as stainless steel. The specific materials selected will depend upon the requirements of the specific chemical products in the vessel. This Safety Pressure Relief Valve Shut-Off is fire proof, shock resistant, leak resistant, and minimizes risk attributable to human error, forces of nature, and vandalism.

It is apparent that various modifications in addition to those discussed above can be made in the Safety Pressure Relief Valve Shut-Off invention. The size, configuration, and arrangement of components can be changed to meet specific requirements. The Pressure Transmitting Conduit can include branch conduits allowing for more than one BOS Device. Soft valve component surfaces can be employed to insure tight seals.

An assortment of compression and tension springs can be used to facilitate operation of the Safety Pressure Relief Valve Shut-Off under special conditions. These and other changes can be made in the apparatus of this invention, provided the functioning thereof is not adversely affected. Therefore, the scope of the present invention is to be limited only by the following claims.

What I claim is:

1. A safety device consisting of a normally open valve, a blow out safety device, a pressure transmitting conduit, in combination, protecting against an uncontrollable leak from a vessel due to a faulty fixture on the vessel,
   a. wherein a normally open valve is strategically located totally within the vessel, between the product in the vessel and the fixture,
   b. wherein a blow out safety device is strategically located in the shell of the vessel, remote from the normally open valve,
   c. wherein a pressure transmitting conduit communicates between the normally open valve and the blow out safety device,
   d. wherein a fluid under pressure introduced into the blow out safety device, closing the normally open valve,
   e. wherein at a preset excess pressure of the product in the vessel, a blow out plug, rupturing, allowing the normally open valve to reopen,
   f. wherein the blow out safety device, comprising a flexible partition will further assure that no product is lost due to failure of a part of the said safety device.

2. A safety device consisting of a normally open valve, a blow out safety device, and a presure transmitting conduit, in combination, protecting against an uncontrollable leak from a vessel due to a faulty safety relief valve, or similar fixture, on a vessel;
   a. wherein the normally open valve, strategically located totally within the vessel, between the product in the vessel and the fixture,
   b. wherein the normally open valve comprising a valve subassembly, and an actuator subassembly,
   c. wherein the valve subassembly comprising a valve body, a valve head, a valve seat, a push rod,
   d. wherein the actuator subassembly comprising an actuator body, a flexible partition, attached to one end of the push rod,
   e. wherein the blow out safety device comprising a body subassembly attachable into the shell of the vessel, a flexible partition, a pressure release blow out plug with a preset rupture point, an actuator connector valve exposed to the outside of the vessel, f. wherein the pressure transmitting conduit, attached at one end to the blow out safety device, the other end to the actuator subassembly, being a leak proof conduit between the actuator connector valve and the flexible partition of the normally open valve actuator subassembly, g. wherein an uncompressable fluid between the flexible partition of the normally open valve actuator subassembly and the flexible partition of the blow out safety device, being a fixed volume, h. wherein an actuating fluid under pressure introduced into the actuator connector valve, moving the flexible partition of the normally open valve actuator, closing the normally open valve, i. wherein the normally open valve remaining closed as long as the actuator connector valve remains closed, j. wherein excessive pressure from the product of the vessel, freely communicating through the normally open valve actuator, the pressure transmitting conduit, the blow out safety device, to the blow out plug, k. wherein the pressure of the product in the vessel exceeding the preset rupture point of the blow out plug, the blow out plug rupturing, releasing the actuating fluid, allowing the normally open valve to reopen, l. wherein the blow out safety device comprising a flexible partition, assuring that no product is lost due to failure of a part of the said safety device.

* * * * *